(12) United States Patent
Takiguchi

(10) Patent No.: US 6,868,192 B2
(45) Date of Patent: Mar. 15, 2005

(54) IMAGE PROCESSING APPARATUS, IMAGE PROCESSING SYSTEM, IMAGE PROCESSING METHOD, AND STORAGE MEDIUM

(75) Inventor: Hideo Takiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 09/742,432

(22) Filed: Dec. 22, 2000

(65) Prior Publication Data

US 2001/0005433 A1 Jun. 28, 2001

(30) Foreign Application Priority Data

Dec. 27, 1999 (JP) .......................................... 11-371806

(51) Int. Cl.[7] .............................................. G06K 9/00
(52) U.S. Cl. ...................... 382/299; 345/668; 345/670; 345/689; 348/581; 348/704
(58) Field of Search ................................ 382/293, 298, 382/299, 100; 345/660, 661, 662, 668, 670, 671, 698; 348/561, 581, 582, 96, 97; 358/296, 448, 450, 453, 474, 483, 488, 499, 497, 451

(56) References Cited

U.S. PATENT DOCUMENTS

| | | | | |
|---|---|---|---|---|
| 5,195,174 A | * | 3/1993 | Kagawa ....................... 358/1.2 |
| 5,231,679 A | * | 7/1993 | Matsuura et al. ............ 382/232 |
| 5,424,853 A | * | 6/1995 | Miyaza ........................ 358/451 |
| 5,515,181 A | * | 5/1996 | Iyoda et al. ................. 358/474 |
| 5,553,201 A | * | 9/1996 | Muramatsu ................... 358/1.9 |
| 5,995,201 A | * | 11/1999 | Sakaguchi ..................... 355/55 |
| 6,094,218 A | * | 7/2000 | Suzuki et al. .................. 348/96 |
| 6,671,394 B1 | * | 12/2003 | Sako ............................ 382/132 |

* cited by examiner

Primary Examiner—Bhavesh M. Mehta
Assistant Examiner—Abolfazl Tabatabai
(74) Attorney, Agent, or Firm—Fitzpatrick, Cella, Harper & Scinto

(57) ABSTRACT

To provide an image processing apparatus in which even in case of a laterally-wide or vertically-long image, the user can easily and certainly recognize the image by its thumbnail display, there is disclosed an image processing apparatus constructed in such a manner that when a reduced image (thumbnail image) is generated from a plurality of images by image management list display software, an aspect ratio of a target image is examined, and when it is determined that the aspect ratio is larger than a predetermined value and the target image is sufficiently laterally wide or vertically long, the thumbnail image is not generated merely by reducing the whole target image but, as a thumbnail image, it is fixed so as to become a thumbnail image of a predetermined aspect ratio, and a thumbnail image of only a mid section excluding end sections of the target image is generated.

29 Claims, 12 Drawing Sheets

US 6,868,192 B2

IMAGE PROCESSING APPARATUS, IMAGE PROCESSING SYSTEM, IMAGE PROCESSING METHOD, AND STORAGE MEDIUM

BACKGROUND OF THE INVENTION

1. Field of the Invention

The invention relates to an image processing apparatus, an image processing system, and an image processing method which are used in, for example, an apparatus or system for managing a number of images and displaying a list of reduced images (thumbnail images) of those images and to a storage medium in which processing steps for embodying them have been stored in a computer-readable state.

2. Related Background Art

In recent years, for example, there have been used many software (hereinafter, referred to as "image management list display software") for fetching a number of images obtained by an image input device such as scanner, digital camera, or the like into a personal computer (hereinafter, simply referred to as "PC") and displaying a list of them.

FIG. 11 shows a display picture plane 900 of a PC which is obtained by image management list display software.

The display picture plane 900 comprises a window 901 and a window 902.

The window 901 is called a tree view. A folder construction in a hard disk of the PC is shown in the window 901.

When the user designates, for example, a folder shown by "901a" by clicking a mouse from the folder construction shown by the window 901, a list of reduced images (hereinafter, also referred to as "thumbnail images) 903(1), 903(2), 903(3), . . . of image files existing in such a folder is displayed in the window 902 on the right side of the window 901 (hereinafter, the operation for displaying such thumbnail images is also referred to as a "thumbnail display").

The user, therefore, can easily recognize what kind of images the image files existing in the folder 901a are, or the like without performing the operation for opening the image files existing in the folder 901a one by one and can easily find a desired image.

Each of the thumbnail images 903(1), 903(2), 903(3), . . . which are displayed as a list in the window 902 is reduced and generated so as to go in a frame (hereinafter, also referred to as a "thumbnail frame") of some fixed size while keeping an aspect ratio.

For example, in the case where a frame size is equal to 100 (in the lateral direction)×100 (in the vertical direction) pixels (dots) and an image (main image) serving as an original image of the thumbnail image is set to a size of 640 (lateral direction)×480 (vertical direction) dots, the thumbnail image is generated at a size of 100 (lateral direction)×75 (vertical direction) dots.

If the main image is an image having a size of 500 (lateral direction)×1000 (vertical direction) dots, a thumbnail image of such a main image is generated at a size of 50 (lateral direction)×100 (vertical direction) dots.

For example, when a laterally-wide scene such as a landscape or the like is photographed by a digital camera, there is a case where a photograph image of such a scene cannot be obtained by photographing once.

In such a case, by performing the photography a plurality of number of times and synthesizing a plurality of photograph images thus obtained in the lateral direction on the PC, a laterally-wide scene such as a landscape or the like can be obtained as one photograph image (one wide image, namely, panorama image).

Specifically speaking, for example, in the case where one photograph image having a size of 640 (lateral direction)×480 (vertical direction) dots is obtained by photographing once and a plurality of relevant photograph images are synthesized in the lateral direction, one scene is divisionally photographed twice in a manner such that the same location overlaps by an amount of 50% in each photography in this instance. By synthesizing the two photograph images thus obtained, a panorama image having a size of 960 (lateral direction)×480 (vertical direction) dots can be obtained.

In case of synthesizing three photograph images by photographing three times in a manner similar to the case mentioned above, therefore, a panorama image having a size of 1280 (lateral direction)×480 (vertical direction) dots is obtained. A panorama image having a size of 1600 (lateral direction)×480 (vertical direction) dots is obtained by photographing four times. A panorama image having a size of 1920 (lateral direction)×480 (vertical direction) dots is obtained by photographing five times.

In the conventional display apparatus using the image management list display software as mentioned above, however, if the laterally-wide panorama image obtained by synthesizing a plurality of photograph images in the lateral direction is thumbnail displayed, an image like an elongated rod is displayed in a frame.

For example, if it is intended to display a main image 921 of 1920 (lateral direction)×480 (vertical direction) dots as shown in FIG. 12A so as to go in a thumbnail frame of 100 (lateral direction)×100 (vertical direction) dots as shown in FIG. 12B, a thumbnail image 921' of the panorama image (main image) 921 is generated at a size of 100 (lateral direction)×25 (vertical direction) dots and displayed in a state like an elongated rod.

In the case where a further laterally-wide main image of 3840 (lateral direction)×480 (vertical direction) dots (image obtained by photographing 10 times and synthesizing ten photograph images in the lateral direction, or the like) is thumbnail displayed, a thumbnail image of such a main image is generated at a size of 100 (lateral direction)×13 (vertical direction) dots and displayed in a state like a further elongated rod.

As mentioned above, in the conventional apparatus, if the laterally-wide image is thumbnail displayed, it is displayed in an elongated state like a rod. Therefore, even if the user looks at the thumbnail displayed image, it is extremely difficult to distinguish what kind of image the observed image is.

That is, although it is an object of the image management list display software for the user to easily identify the image by thumbnail displaying it, if a number of laterally-wide images exist as main images, the object such that the user can identify those images cannot be accomplished.

Also in the case where the main image is a vertically-long image (image obtained by photographing a plurality of number of times and synthesizing a plurality of photograph images in the vertical direction, or the like), if such a main image is thumbnail displayed, it is displayed in an elongated state where it is vertically long like a rod. Therefore, even if the user looks at the thumbnail displayed image, it is extremely difficult to distinguish what kind of image the observed image is.

SUMMARY OF THE INVENTION

It is an object of the invention to solve all or at least one of the above problems.

Another object of the invention is to provide an image processing apparatus in which even in case of a laterally-wide or vertically-long image, the user can easily and certainly recognize it by a thumbnail display.

To accomplish the above object, there is provided an image processing apparatus comprising: image obtaining means for obtaining a second image of a predetermined aspect size ratio from a first image on the basis of an aspect size ratio of the first image; and reducing means for reducing the second image obtained by the image obtaining means.

There is also provided an image processing apparatus with the above construction, wherein in case of a size out of a predetermined range, the image obtaining means obtains the second image when the aspect size ratio of the first image is larger than a predetermined value.

There is also provided an image processing apparatus comprising: image obtaining means for obtaining at least two images of a second image of an arbitrary area portion of a first image and a third image of another area portion on the basis of an aspect size ratio of the first image; and reducing means for reducing the second and third images obtained by the image obtaining means by different reduction ratios.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow with reference to the drawings.

First Embodiment

Figure 1:
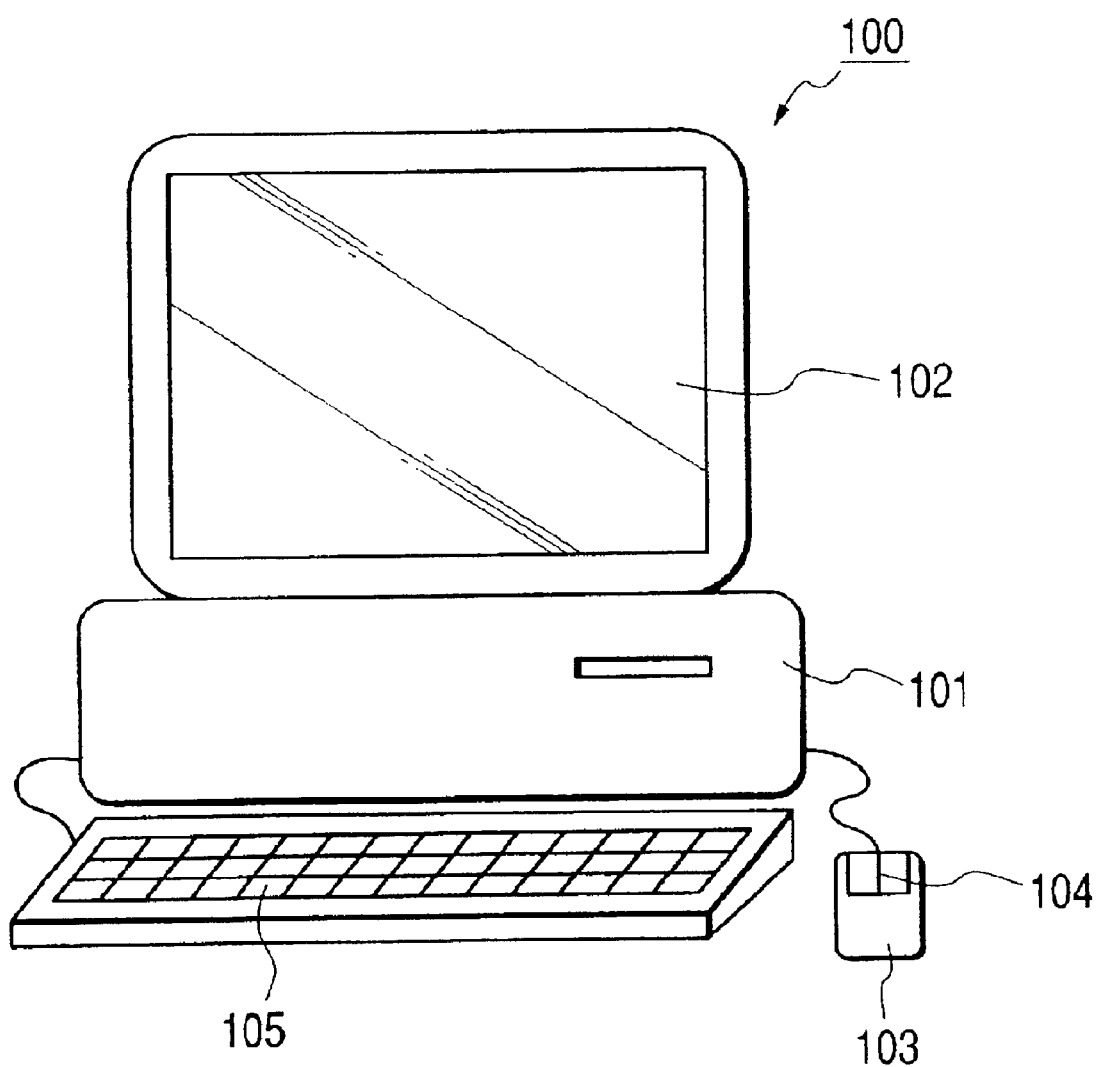
FIG. 1 is a diagram for explaining a construction of a terminal apparatus to which the invention is applied in the first embodiment.

The first embodiment is applied to, for example, a terminal apparatus 100 as shown in FIG. 1. The terminal apparatus 100 comprises a personal computer and is an apparatus having a function such that a number of images obtained by external equipment such as scanner, digital camera, or the like are fetched into the apparatus by activating image management list display software and displayed as a list (thumbnail display).

As shown in FIG. 1, the terminal apparatus 100 has a construction such that a display 102 for displaying various data, a mouse 103 serving as a typical pointing device, and a keyboard 105 are connected to an apparatus main body (computer main body) 101.

A mouse button 104 is provided for the mouse 103.

Figure 2:
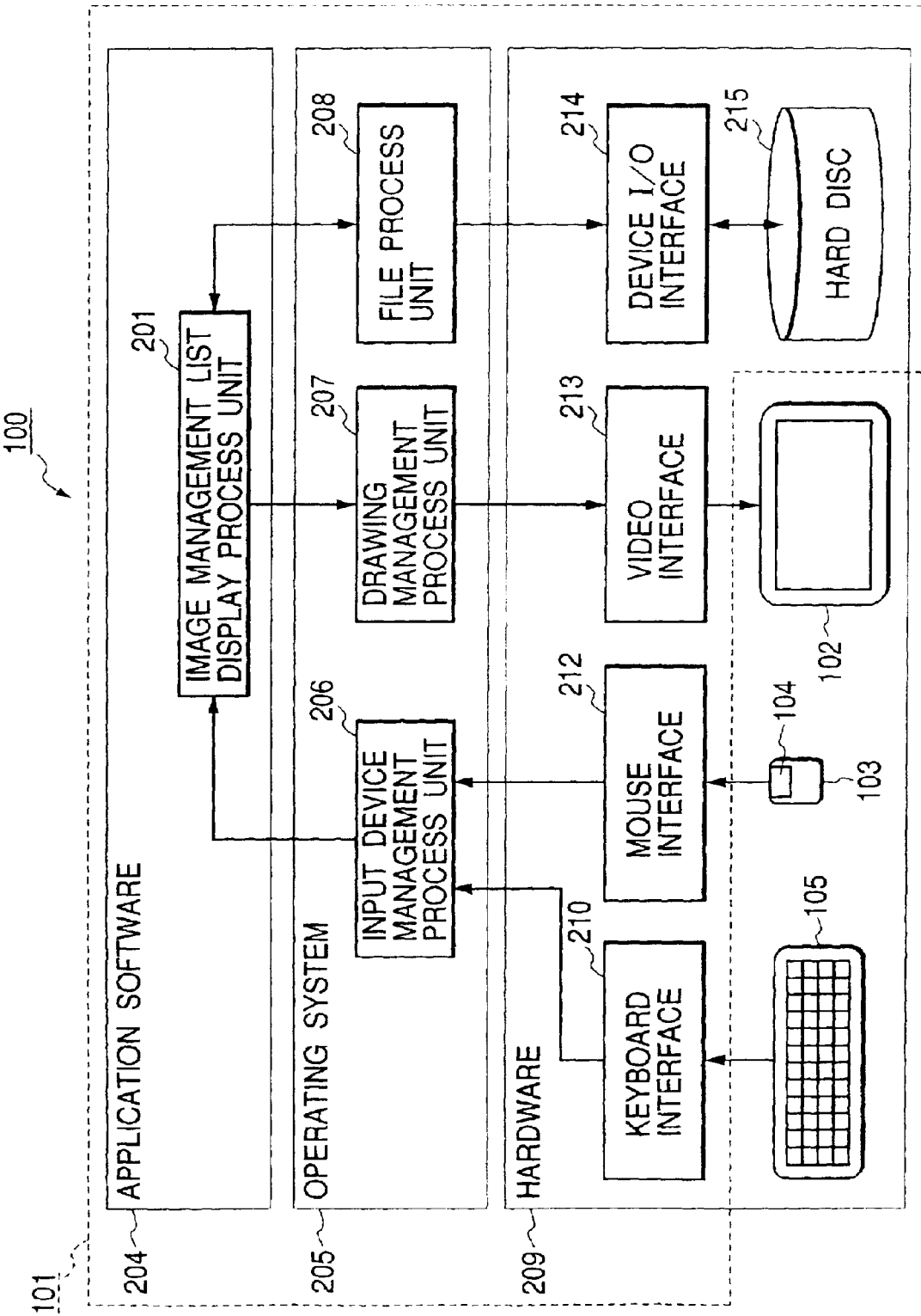
FIG. 2 is a block diagram showing a construction in the terminal apparatus.

FIG. 2 shows the construction of the terminal apparatus 100 in a software (204, 205) or hardware (209) manner.

As hardware 209, the terminal apparatus 100 has not only the display 102, mouse 103, and keyboard 105 shown in FIG. 1 but also a keyboard interface (I/F) 210, a mouse interface 212, a video interface 213, a hard disk 215, and a device interface 214.

The terminal apparatus 100 is constructed in a manner such that the software (operating system: OS) 205 including an input device management process unit 206, a drawing management process unit 207, and a file process unit 208 can operate on the hardware 209.

Further, the terminal apparatus 100 is constructed in a manner such that the software (application software) 204 including an image management list display process unit (process unit by the image management list display software) 201 can operate on the operating system (OS) 205.

The keyboard I/F 210 is an interface for enabling the input device management process unit 206 to receive an input from the keyboard 105. The mouse I/F 212 is an interface for enabling the input device management process unit 206 to receive an input from the mouse 103.

The video I/F 213 is an interface for enabling the drawing management process unit 207 to draw an image onto the display 102.

The hard disk 215 physically stores various files and data. The device I/F 214 is an interface for enabling the file process unit 208 to read and write data from/onto the hard disk 215.

The input device management process unit 206 has a function for enabling the application software 204 to receive an input from the user without being conscious of the hardware 209.

The drawing management process unit 207 has a function for enabling the application software 204 to draw various data without being conscious of the hardware 209.

The file process unit 208 has a function for enabling the application software 204 to input and output files without being conscious of the hardware 209.

The image management list display process unit 201 fetches a number of images obtained by the external equipment such as scanner, digital camera, or the like into the terminal apparatus 100, managing those images, and displaying a list of them (thumbnail display).

For simplicity of explanation, although not shown in FIG. 2, the hardware 209 also has: a CPU for controlling the operation of the whole terminal apparatus 100; a memory in which processing programs for executing the functions of the software 204 and 205, various data, and the like are stored; and the like.

The operating system (OS) 205 also has a memory management process unit and the like.

Figure 3:
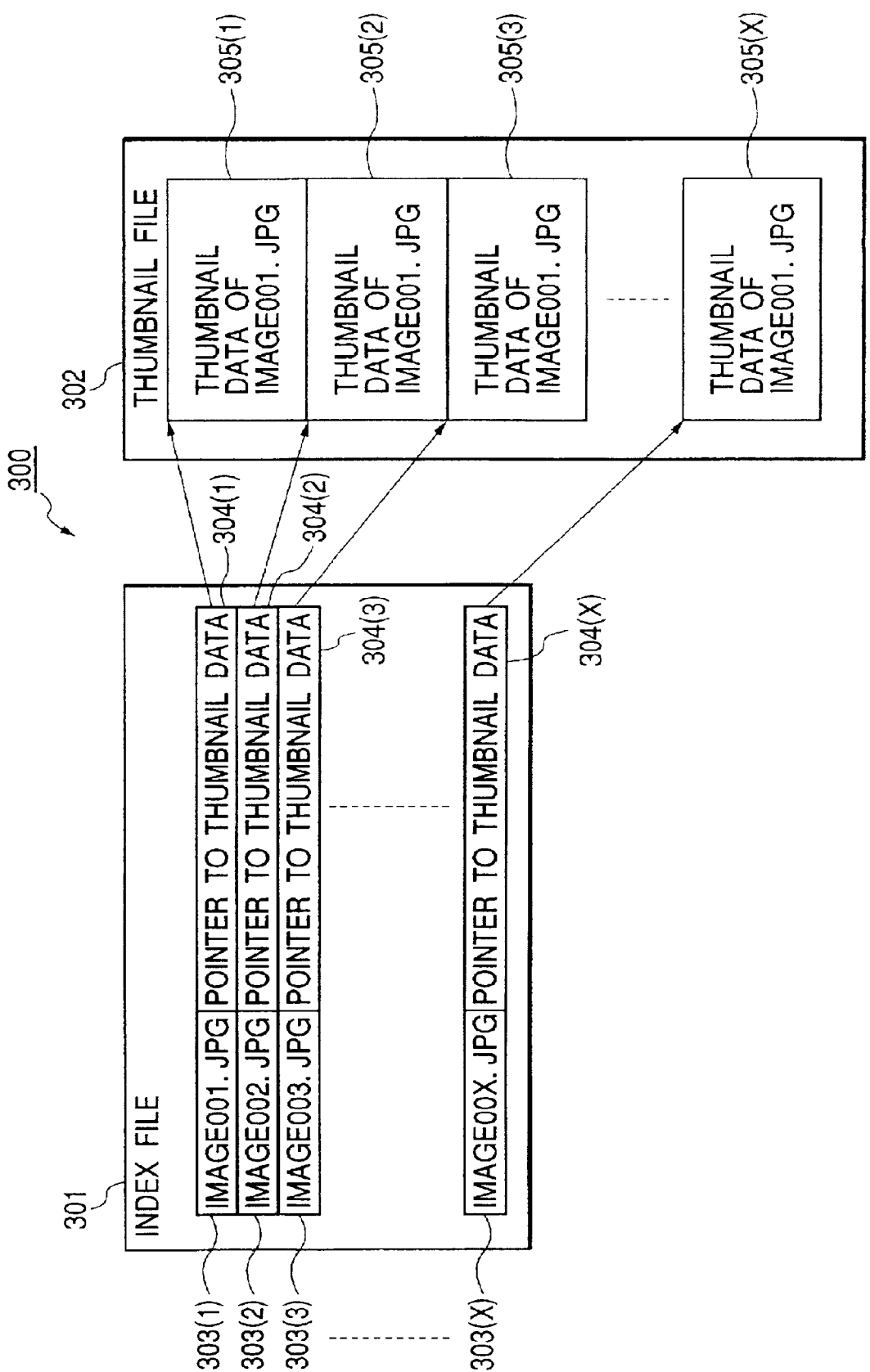
FIG. 3 is a diagram for explaining an example of a data file which is managed by an image management list display process unit of the terminal apparatus.

FIG. 3 shows an example of a data file 300 which is managed by the image management list display process unit 201.

As shown in FIG. 3, the data file 300 includes an index file 301 and a thumbnail file 302. The image management list display process unit 201 stores such a data file 300 onto the hard disk 215 on a folder unit basis and manages.

The index file 301 includes table data comprising: image file name data 303(1), 303(2), 303(3), . . . ; and pointer data 304(1), 304(2), 304(3), . . . corresponding to the image file name data 303(1), 303(2), 303(3), . . . .

The thumbnail file 302 includes data (thumbnail data) 305(1), 305(2), 305(3), . . . of reduced images (thumbnail images) of the images existing in the target folder.

In the index file 301, the image file name data 303(1), 303(2), 303(3), . . . is data of names ("IMAGE001.JPG", "IMAGE002.JPG", etc.) of the image files existing in the target folder.

The pointer data 304(1), 304(2), 304(3), . . . is pointer data to the thumbnail data (thumbnail image data) 305(1), 305(2), 305(3), . . . existing in the thumbnail file 302 corresponding to the image file name data 303(1), 303(2), 303(3), . . . .

Figure 4:
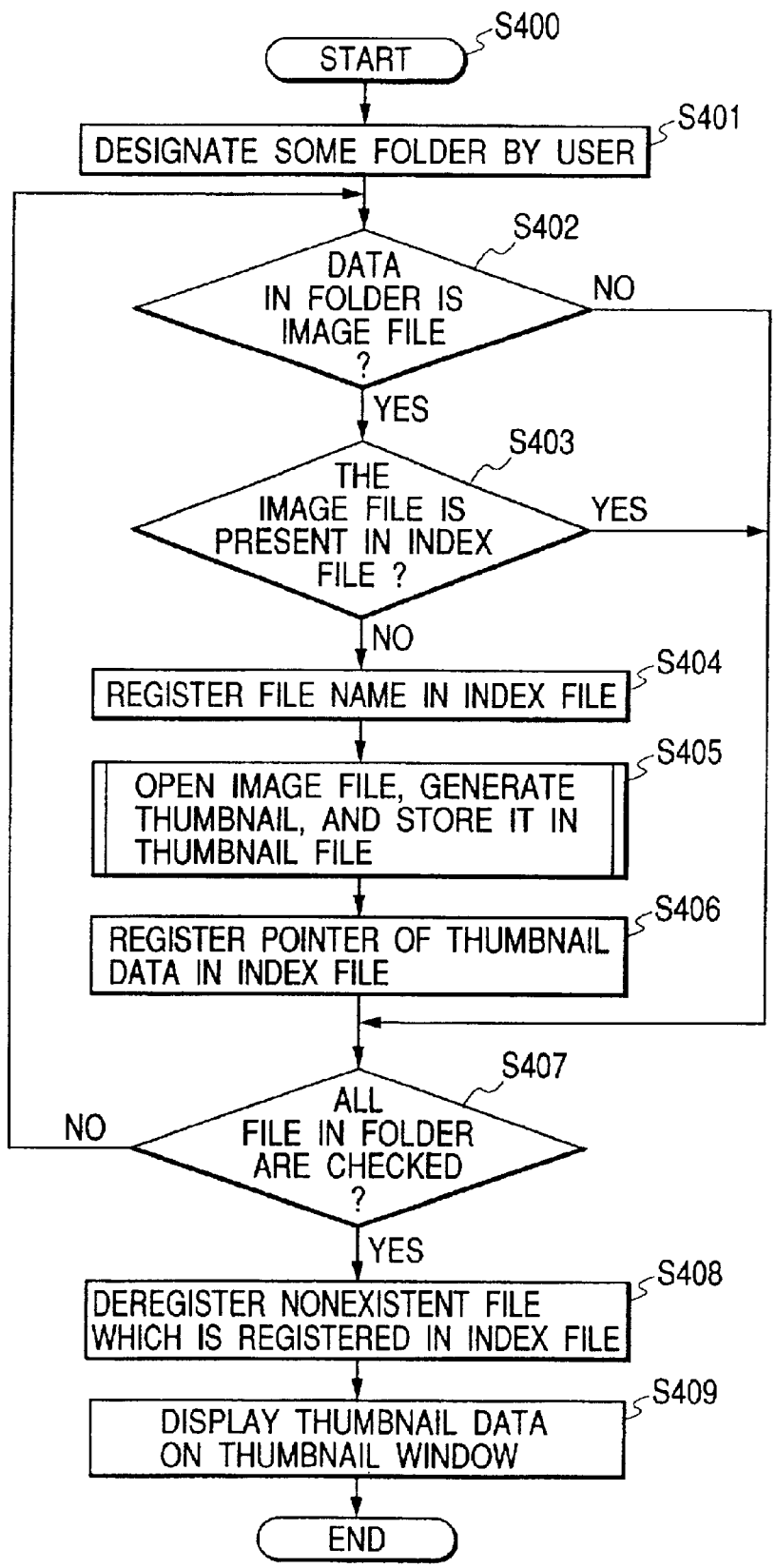
FIG. 4 is a flowchart for explaining the whole operation of the image management list display process unit.

FIG. 4 shows a thumbnail displaying process in the image management list display process unit 201.

Figure 11:
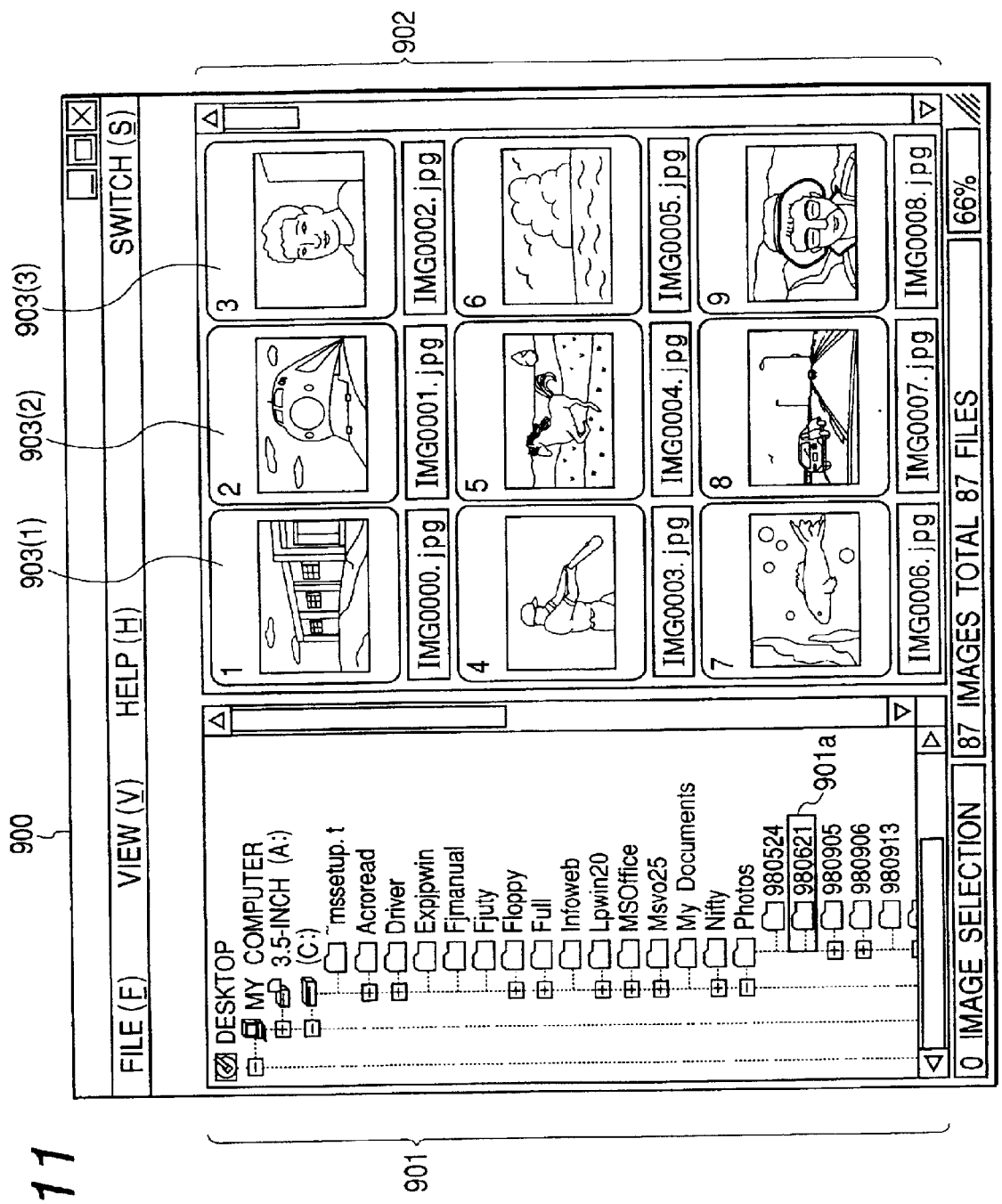
FIG. 11 is a diagram for explaining an example of a display picture plane according to image management list display software.
Figure 12A:
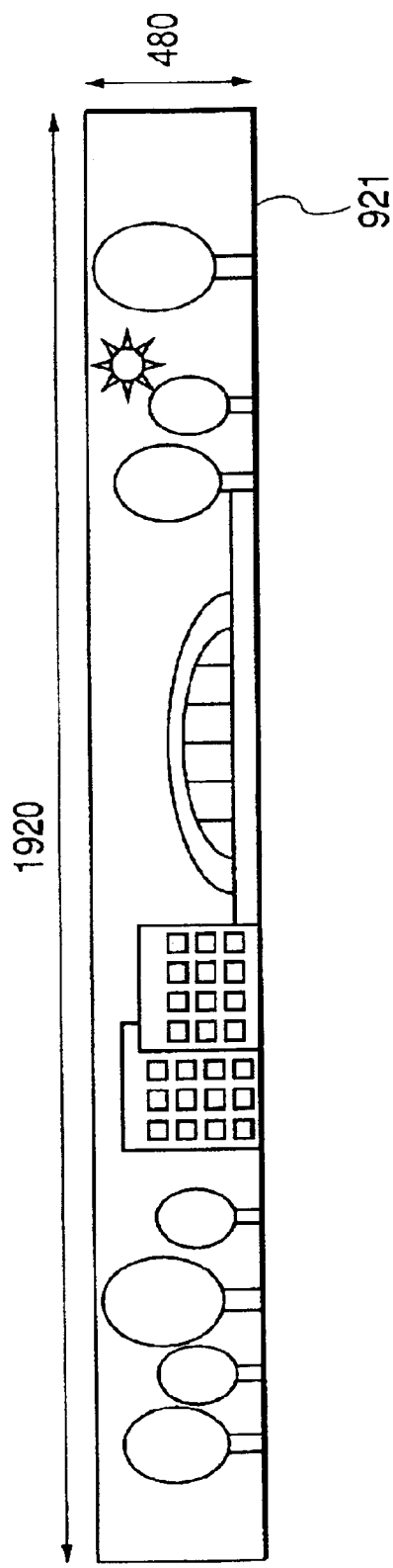
FIGS. 12A and 12B are diagrams for explaining a conventional thumbnail generating process.
Figure 12B:
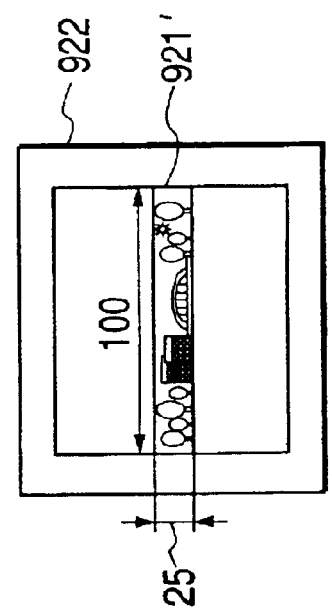

Step S400:

When the application software 204 is activated on the operating system (OS) 205, the image management list display process unit 201 first displays a picture plane 900 as shown in FIG. 11 onto the display 102 of the terminal apparatus 100 (step S400).

Step S401:

Subsequently, the user designates a desired folder in the folder construction shown by the window 901 of the picture plane 900 by using the mouse 103 or the like (designation by a clicking operation or the like).

Designated information is supplied to the image management list display process unit 201 through the mouse I/F 212 and input device management process unit 206.

Step S402:

Subsequently, the image management list display process unit 201 detects the folder (designated folder) shown by the designated information from the hard disk 215 and executes each process in steps S402 to S407 with respect to each of all data existing in the designated folder.

That is, first, in step S402, the image management list display process unit 201 discriminates whether the target data in the designated folder is an image file or not.

This discrimination is made on the basis of, for example, information in a header portion of the target data.

If the target data is not the image file as a result of the discrimination in step S402, processes in next steps S403 to S406 are skipped and the processing routine advances to step S407, which will be explained hereinlater.

Step S403:

If it is determined as a result of the discrimination in step S402 that the target data is the image file, the image management list display process unit 201 refers to the image file name data 303(1), 303(2), 303(3), . . . in the index file 301 shown in FIG. 3, thereby discriminating whether such an image file (target image file) has already been registered in the index file 301 or not. As a result of the discrimination, if the image file has already been registered, processes in next steps S404 to S406 are skipped and the processing routine advances to step S407, which will be explained hereinlater.

Step S404:

As a result of the discrimination in step S403, since the target image file is the image file which was newly added or the like, if it is not registered yet in the index file 301, the image management list display process unit 201 additionally registers the name of the target image file into the index file 301.

For example, when the name of the target image file is assumed to be "IMAGE00X.JPG", as shown in FIG. 3, "IMAGE00X.JPG" is added as image file name data 303(X) into the image file name data 303(1), 303(2), 303(3), . . . in the index file 301.

Step S405:

The image management list display process unit 201 reads out the target image file from the hard disk 215.

Specifically speaking, the target image file is actually opened and loaded into a memory (not shown).

The image management list display process unit 201 performs a reducing process to the target image file in the memory so that the target image file goes in the thumbnail frame of a predetermined size, and adds the target image file after completion of the reducing process as thumbnail data into the thumbnail file 302 shown in FIG. 3.

When the target image file is "IMAGE00X.JPG", consequently, as shown in FIG. 3, thumbnail data 305(X) in the target image file is added to the thumbnail data (thumbnail image data) 305(1), 305(2), 305(3), . . . .

Step S406:

The image management list display process unit 201 additionally registers the pointer data of the thumbnail data added to the thumbnail file 302 in step S406 in correspondence to the image file name data which has additionally been registered in the index file 301 in step S404.

When the target image file is "IMAGE00X.JPG", consequently, as shown in FIG. 3, pointer data 304(X) of the thumbnail data in the target image file is additionally registered to image file name data 303(X) in the index file 301.

Step S407:

The image management list display process unit 201 discriminates whether the execution of each process in steps S402 to S406 has been finished or not with respect to all of the data existing in the designated folder.

As a result of the discrimination, if the data whose process is not executed yet exists in the designated folder, the processing routine is returned to step S402 in order to execute each process in steps S402 to S406 with respect to the unprocessed data.

Thus, if the execution of each process in steps S402 to S406 is finished with respect to all of the data existing in the designated folder, the processing routine advances to next step S408.

Step S408:

The image management list display process unit 201 examines the image file which does not actually exist in the designated folder although it has been registered in the index file 301.

That is, for example, in the case where the user erased the image file from the designated folder or moved it to another folder or the like, the image file which does not actually exist in the designated folder although it has been registered in the index file 301 is generated. Therefore, the image management list display process unit 201 discriminates whether the image file corresponding to it exists or not. If it exists, the data corresponding to the relevant image file is deleted from the index file 301 and thumbnail file 302.

Thus, the thumbnail data for all of the image files in the designated folder exist in the thumbnail file 302.

Step S409:

The image management list display process unit 201 displays a list of the thumbnail data in the thumbnail file 302 onto the window 902 in the picture plane 900 displayed by the display 102 through the drawing management process unit 207 and video I/F 213.

Figure 5:
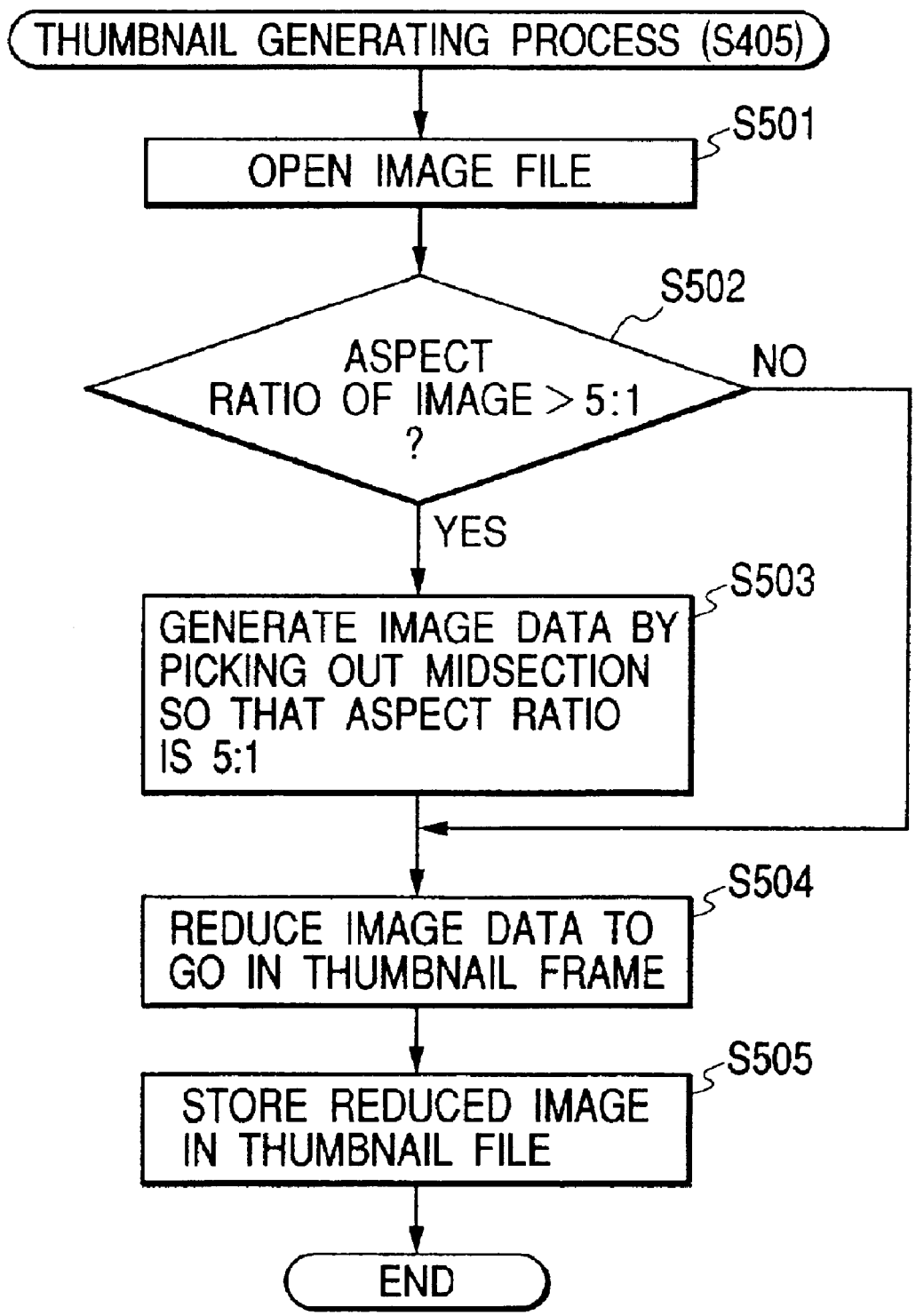
FIG. 5 is a flowchart for explaining a thumbnail generating process which is executed by the image management list display process unit.

Although the image files existing in the folder designated by the user are thumbnail displayed as mentioned above, in the embodiment, particularly, the generating process of the thumbnail data in step S405 is executed, for example, in accordance with a flowchart shown in FIG. 5.

Step S501:

First, the image management list display process unit 201 opens the target image file and loads it into the memory.

Figure 6:
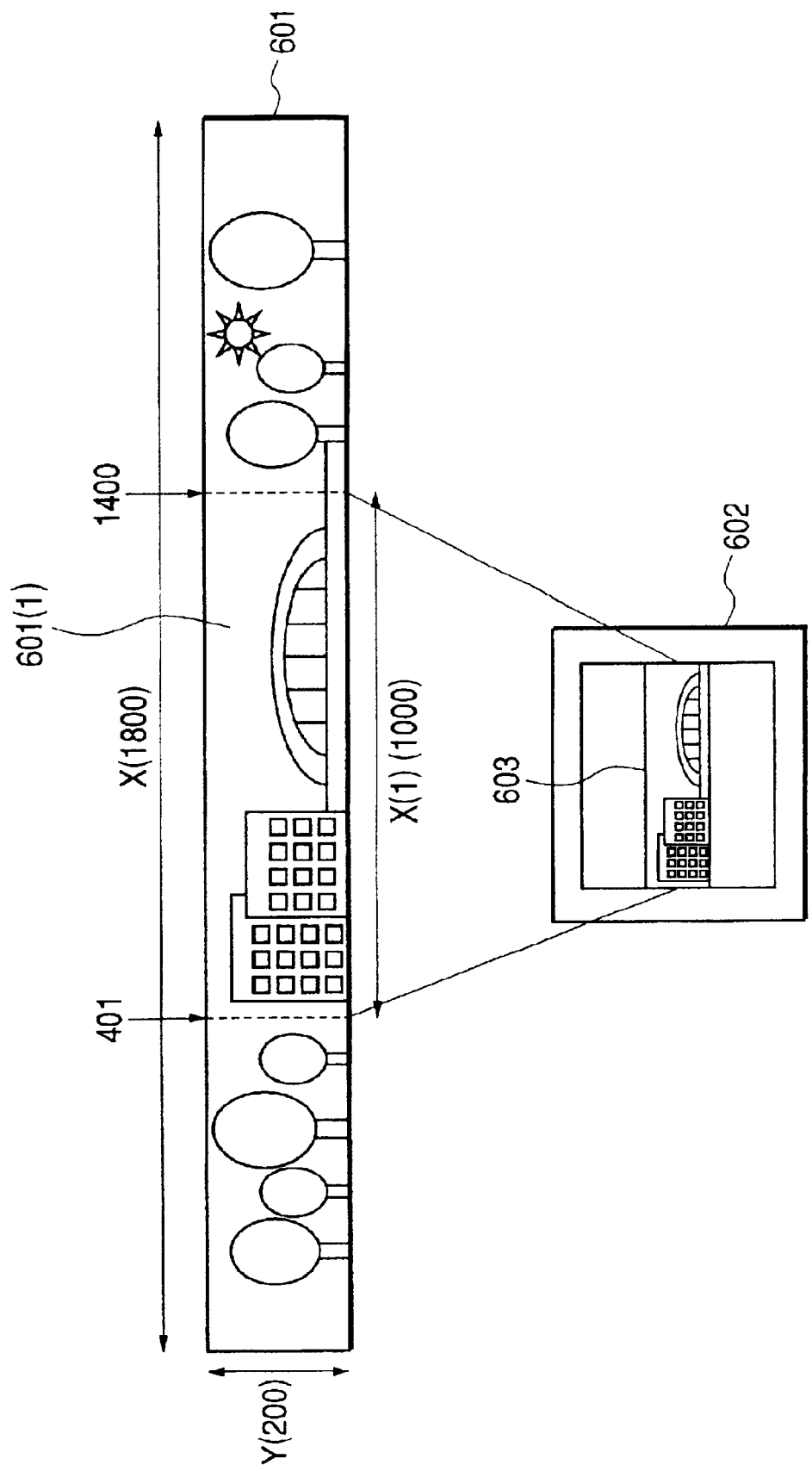
FIG. 6 is a diagram for explaining an example of a thumbnail image obtained as a result of execution of the thumbnail generating process.

For example, it is now assumed that an image 601 as shown in FIG. 6 has been loaded into the memory.

Step S502:

The image management list display process unit 201 discriminates whether an aspect ratio of the image 601 is larger than a predetermined value or not.

For example, whether a lateral size of the image 601 is larger than a value that is five or more times as large as a vertical size or not or whether the vertical size is larger than a value that is five or more times as large as the lateral size or not is discriminated.

In the embodiment, although the range where one of the vertical and lateral sizes is the value that is five times as large as the other one has been set, naturally, the invention is not limited to it but it can be freely set at the designing stage. Those sizes can be also set to desired values by the user.

In this case, they can be arbitrarily set to values such that if the user reduces them normally, he will feel it difficult to confirm a thumbnail image.

As a result of the discrimination, if the ratio of the lateral size X and vertical size Y of the image 601 is not larger than 5:1, the process in next step S503 is skipped and the processing routine advances to step S504, which will be explained hereinlater.

Step S503:

As a result of the discrimination in step S502, if the ratio of the lateral size X and vertical size Y of the image 601 is larger than 5:1, as shown in FIG. 6, the image management list display process unit 201 picks out the image in which the ratio of the lateral size X and vertical size Y is equal to 5:1 (in case of a laterally-wide image, the image in which the lateral size X(1): vertical size Y=5:1; in case of a vertically-long image, the image in which the lateral size X:vertical size Y=1:5) from the mid section of the image 601 and generates it.

Thus, in the case where the image 601 is an image in which the lateral size X=1800 dots and the vertical size Y=200 dots, an image 601(1) (image in which the lateral size X(1)=1000 dots, the vertical size Y=200 dots) in the area corresponding to 1000 dots from the 401st dot in the lateral direction is generated.

Step S504:

When the aspect ratio of the image 601 is not larger than the predetermined value, the image management list display process unit 201 performs a reducing process to the image 601 itself so as to go in a thumbnail frame 602 of a predetermined size. When the aspect ratio of the image 601 is larger than the predetermined value, the image management list display process unit 201 performs a reducing process to the image 601(1) which was formed from the mid section of the image 601 and whose aspect ratio is equal to a predetermined value so as to go in the thumbnail frame 602 of the predetermined size. In this manner, the process unit 201 generates a thumbnail image of the image 601 or 601(1).

At this time, the reducing process is performed while keeping the aspect ratio of the image 601 or 601(1) (the reducing process at the same zoom ratio in both of the vertical and lateral directions).

Thus, in the case where the thumbnail frame 602 has a size of, for example, 100 dots in the lateral direction×100 dots in the vertical direction, a thumbnail image of 100 dots in the lateral direction×20 dots in the vertical direction is generated.

Step S505:

The image management list display process unit 201 adds the thumbnail image generated in step S504 as thumbnail data into the thumbnail file 302.

As mentioned above, according to the embodiment, when a list of the images in the folder designated by the user is displayed (thumbnail display) by the thumbnail image (reduced image), if the aspect ratio of the target image is larger than the predetermined value, the image whose aspect ratio is equal to the predetermined value is obtained from the mid section of the target image, the thumbnail image is generated while keeping the aspect ratio of the image, and the list is displayed. Therefore, a situation such that when the laterally-wide image is thumbnail displayed, it is displayed in an elongated state like a rod as in the conventional one is eliminated. The user looks at the thumbnail displayed image and can identify what kind of image the observed image is.

Second Embodiment

Figure 7:
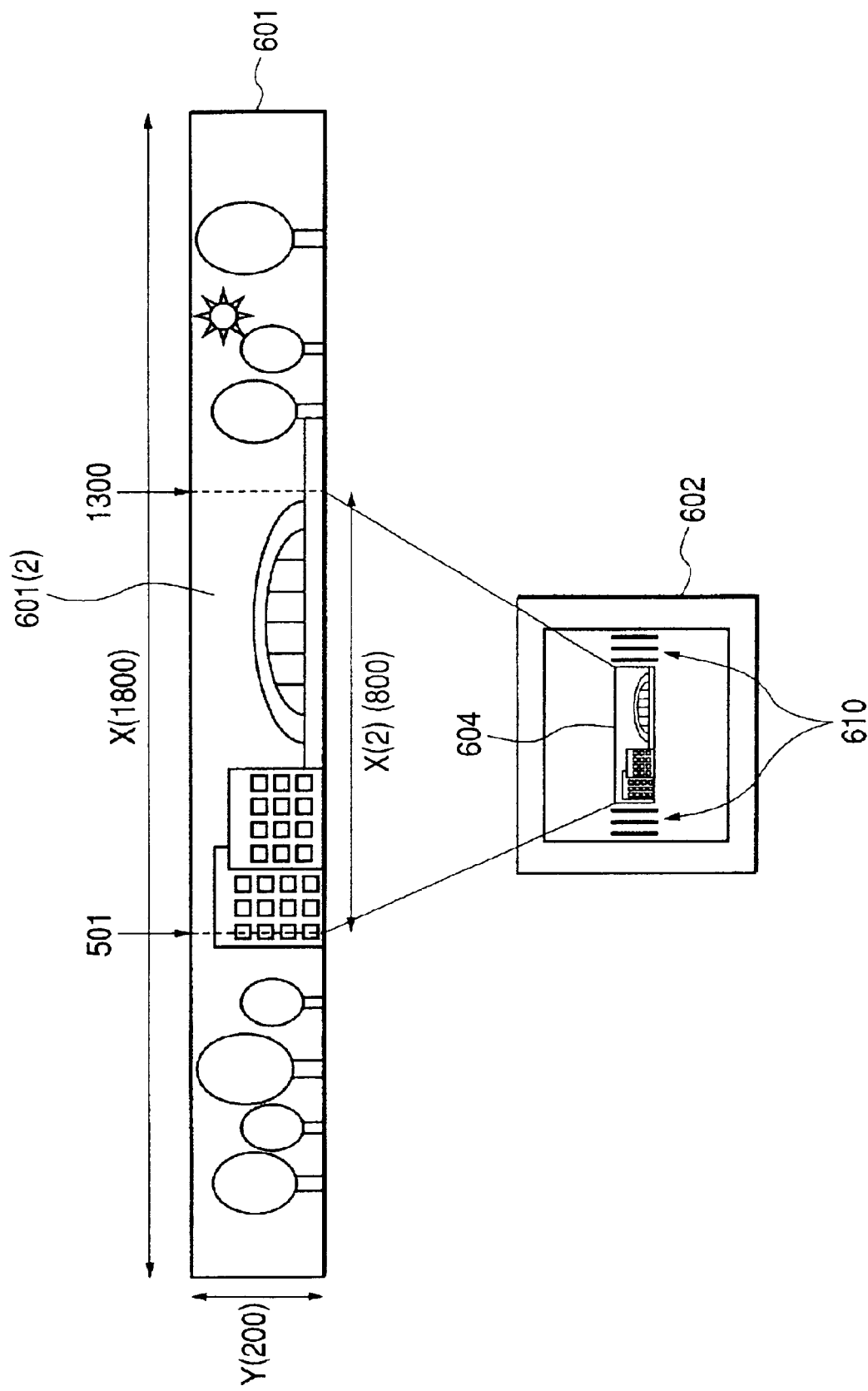
FIG. 7 is a diagram for explaining an example of a thumbnail image obtained in the second embodiment.

In the embodiment, as shown in FIG. 7, when the aspect ratio of the target image 601 is out of a predetermined range, an image 601(2) whose aspect ratio lies within a predetermined range is obtained from the mid section of the target image 601. A thumbnail image is generated while keeping the aspect ratio of the image 601(2) and a list is displayed.

At this time, marks 610 are added to the thumbnail image and the resultant image is displayed.

Figure 8:
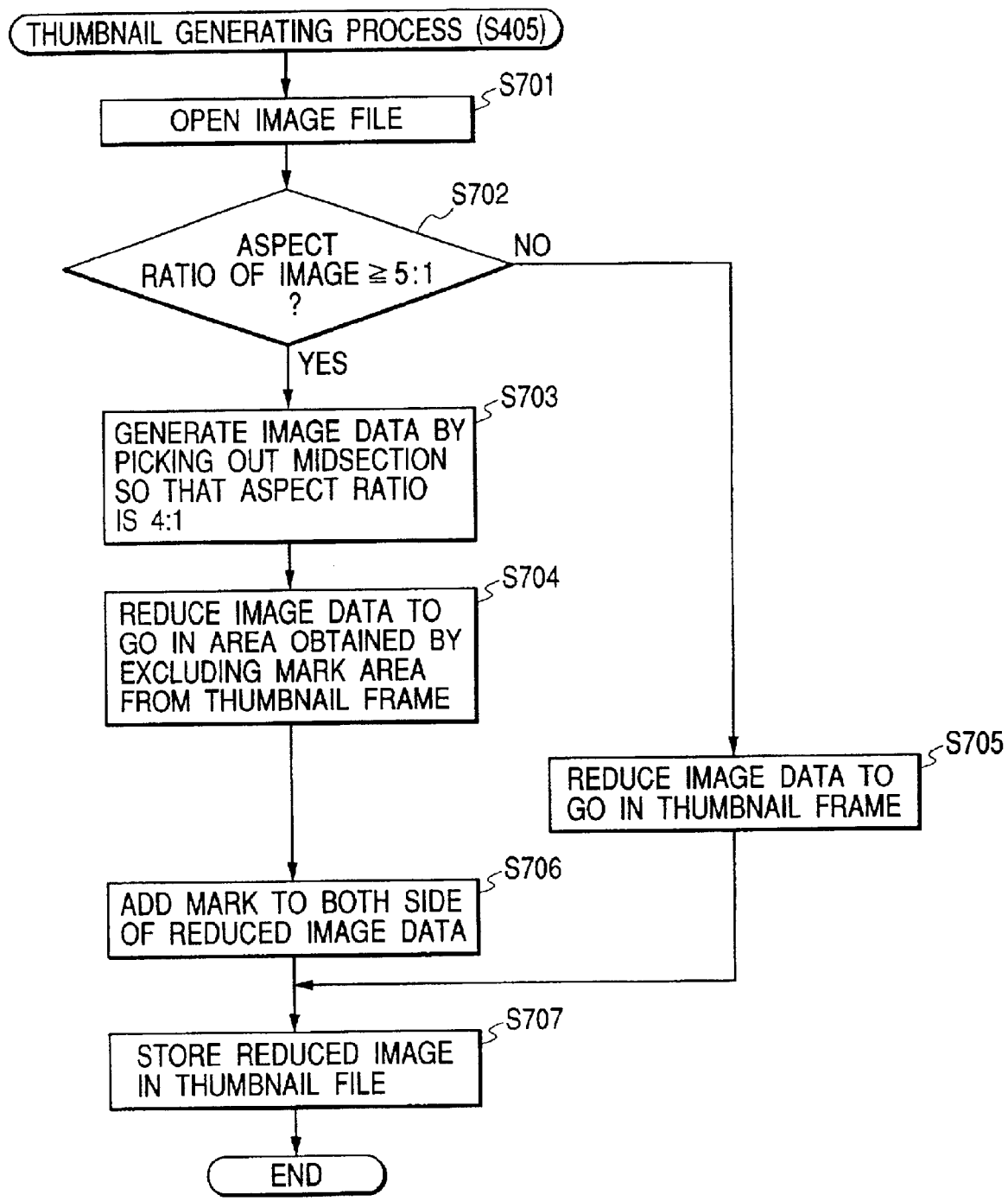
FIG. 8 is a flowchart for explaining the thumbnail generating process in the second embodiment.

Therefore, in the embodiment, the generating process of the thumbnail data in step S405 shown in FIG. 4 is replaced by a process according to, for example, a flowchart shown in FIG. 8.

Steps S701, S702:

First, in a manner similar to steps S501 and S502 in FIG. 5, the image management list display process unit 201 opens the target image file 601, loads it into the memory (step S701), and discriminates whether the aspect ratio of the image 601 lies within a predetermined range or not (step S702).

For example, whether the ratio of the lateral size X and vertical size Y of the image 601 is equal to or larger than 5:1 or not is discriminated. That is, whether the lateral size is equal to a size that is five or more times as large as the vertical size or not or whether the vertical size is equal to a size that is five or more times as large as the lateral size or not is discriminated.

Step S703:

As a result of the discrimination in step S702, if the ratio of the lateral size X and vertical size Y of the image 601 is equal to or larger than 5:1, the image management list display process unit 201 generates an image (lateral size X(1): vertical size Y=4:1) in which the ratio of the lateral size X and vertical size Y is equal to or less than a predetermined value (5:1), for example, 4:1 from the mid section of the image 601 as shown in FIG. 7.

Thus, in the case where the image 601 is an image of the lateral size X=1800 dots and the vertical size Y=200 dots, the image 601(2) (the image of the lateral size X(2)=800 dots, the vertical size Y=200 dots) in an area corresponding to 800 dots from the 501st dot in the lateral direction is generated.

Step S704:

The image management list display process unit 201 performs the reducing process to the image 601(2) generated in step S703 so that the image 601(2) goes in an area obtained by excluding an area corresponding to the marks 610 from the thumbnail frame 602 of a predetermined size, thereby generating the thumbnail image of the image 601(2).

At this time, the reducing process is performed while keeping the aspect ratio of the image 601(2) (reducing process at the same zoom ratio in both of the vertical and lateral directions).

For example, in the case where the thumbnail frame 602 has a size of 100 dots in the lateral direction×100 dots in the vertical direction and each of the right and left sides which are necessary for adding the marks 610 has a size of 10 dots in the lateral direction×100 dots in the vertical direction, a thumbnail image of 80 dots in the lateral direction×20 dots in the vertical direction is generated.

Step S706:

The image management list display process unit 201 adds the marks 610 to both right and left end sections of the thumbnail image of the image 601(2) generated in step S704.

The marks 610 here are, for example, marks of three straight lines in the vertical direction.

Thus, a thumbnail image of 100 dots in the lateral direction×20 dots in the vertical direction in which the mark 610 of 10 dots in the lateral direction has been added to each of both of the right and left end sections is generated.

After that, the processing routine advances to step S707, which will be explained hereinlater.

Step S705:

As a result of the discrimination in step S702, if the ratio of the lateral size X and vertical size Y of the image 601 is less than 5:1, the image management list display process unit 201 performs the reducing process to the image 601 itself so as to go in the thumbnail frame 602 of the predetermined size, thereby generating a thumbnail image of the image 601.

At this time, the reducing process is performed while keeping the aspect ratio of the image 601 (the reducing process at the same zoom ratio in both of the vertical and lateral directions).

Thus, for example, if the thumbnail frame 602 has a size of 100 dots in the lateral direction×100 dots in the vertical direction, a thumbnail image of 100 dots in the lateral direction×20 dots in the vertical direction is generated.

After that, the processing routine advances to next step S707.

Step S707:

The image management list display process unit 201 adds the thumbnail image generated in step S706 or S705 as thumbnail data into the thumbnail file 302.

As mentioned above, according to the embodiment, when a list of the images in the folder designated by the user is displayed (thumbnail display) by thumbnail images (reduced images), when the aspect ratio of the target image is equal to or larger than the predetermined value, the image whose aspect ratio is less than the predetermined value (value of the aspect ratio which is obtained in consideration of the area that is necessary for adding the marks) is obtained from the mid section of the target image. The thumbnail image is generated while keeping the aspect ratio of such an image. After that, the marks are added to both of the right and left end sections of the thumbnail image and the list is displayed. Therefore, a situation such that when the laterally-wide image is thumbnail displayed, it is displayed in an elongated state like a rod as in the conventional one is eliminated. The user looks at the thumbnail displayed image and can identify what kind of image such an image is. Further, the user can also easily identify that such an image is a laterally-wide image whose aspect ratio is out of the predetermined range.

Third Embodiment

Figure 9:
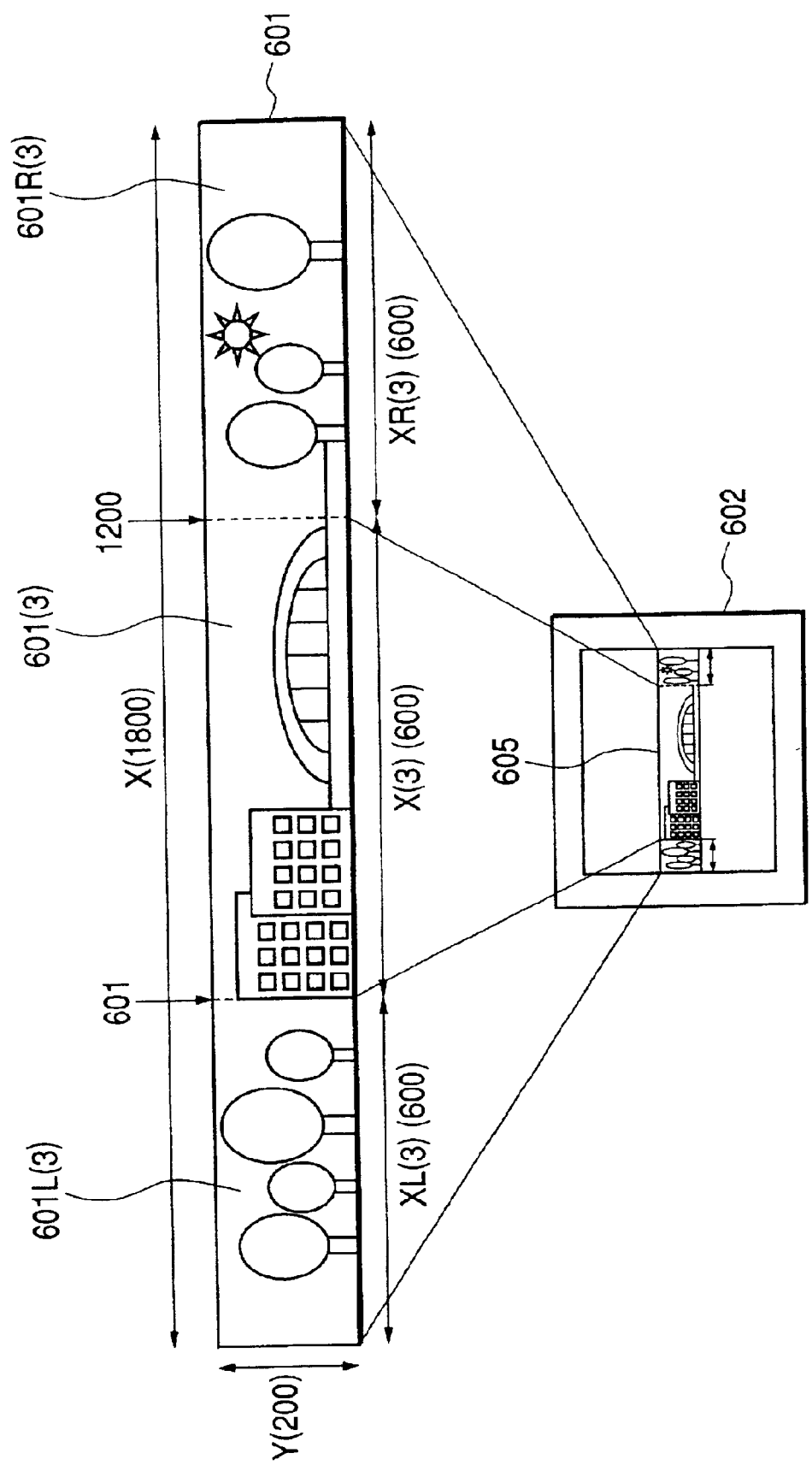
FIG. 9 is a diagram for explaining an example of a thumbnail image which is obtained in the third embodiment.

In the embodiment, as shown in FIG. 9, when the slender ratio of the target image 601 is equal to or larger than a predetermined value, an image 601(3) whose aspect ratio is less than the predetermined value is obtained from the target image 601. Images 601R(3) and 601L(3) at both right and left ends of the image 601(3) are obtained.

The image 601(3) and images 601R(3) and 601L(3) are reduced at different reduction ratios. The reduced image of the image 601(3) and the reduced images of the images 601R(3) and 601L(3) are synthesized and a resultant image is list displayed as a thumbnail image of the target image 601.

Figure 10:
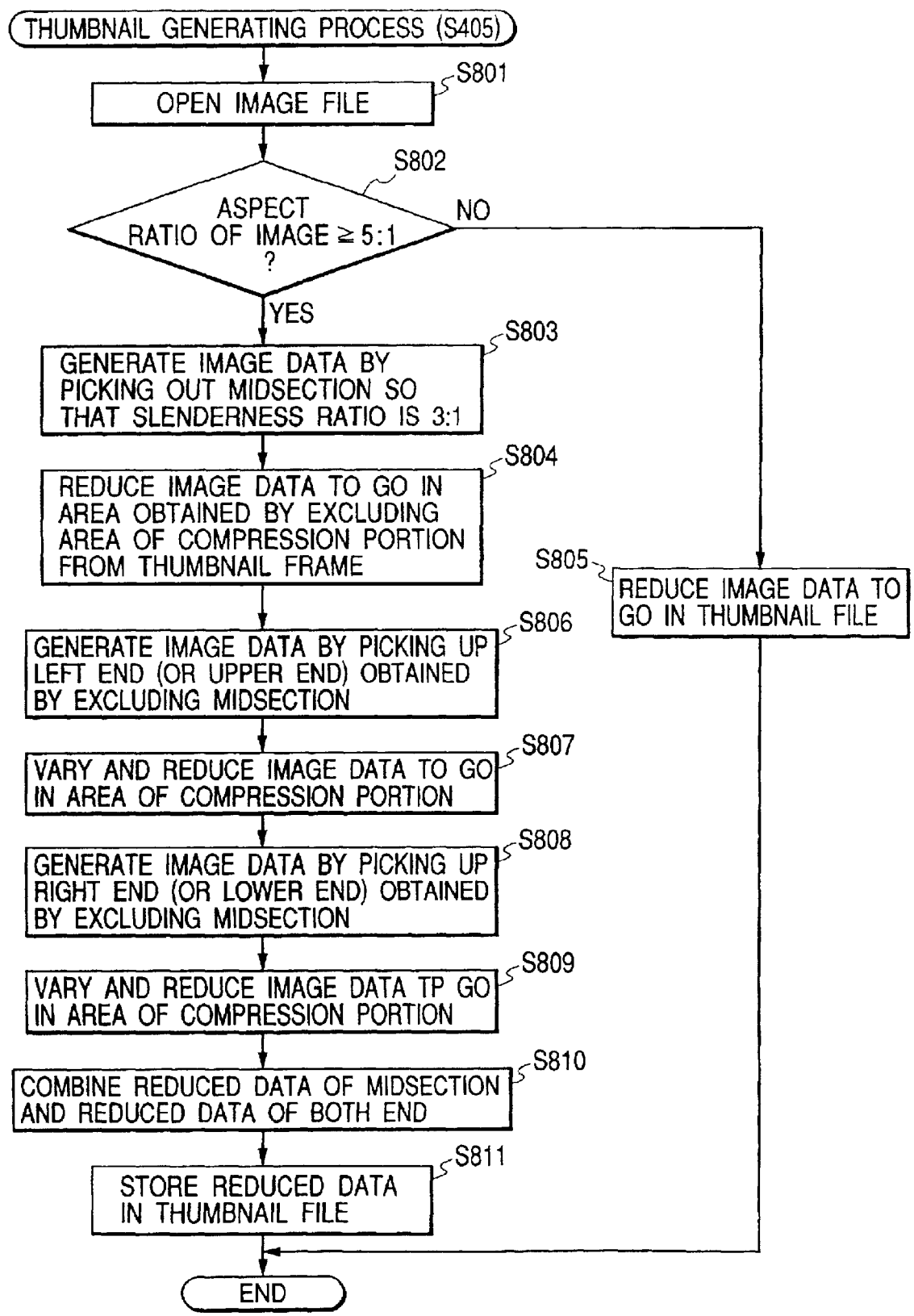
FIG. 10 is a flowchart for explaining the thumbnail generating process in the third embodiment.

Therefore, according to the embodiment, the generating process of the thumbnail data in step S405 shown in FIG. 4 is replaced by a process according to, for example, a flowchart shown in FIG. 10.

Steps S801, S802:

First, in a manner similar to steps S501 and S502 in FIG. 5, the image management list display process unit 201 opens the target image file 601, loads it into the memory (step S801), and discriminates whether the aspect ratio of the image 601 is equal to or larger than a predetermined value or not (step S802).

For example, whether the ratio of the lateral size X and vertical size Y of the image 601 is equal to or larger than 5:1 or not is discriminated. That is, whether the lateral size is equal to a value that is five or more times as large as the vertical size or not or whether the vertical size is equal to a value that is five or more times as large as the lateral size or not is discriminated.

Step S803:

As a result of the discrimination in step S802, when the ratio of the lateral size X and vertical size Y of the image 601 is equal to or larger than 5:1, as shown in FIG. 9, the image management list display process unit 201 generates an image (lateral size X(1):vertical size Y=3:1) in which the ratio of the lateral size X and vertical size Y is less than the predetermined value (5:1), for example, 3:1 from the mid section of the image 601.

Thus, when the image 601 is an image of the lateral size X=1800 dots and the vertical size Y=200 dots, the image 601(3) (the image of the lateral size X(3)=600 dots, vertical size Y=200 dots) in an area corresponding to 600 dots from the lateral 601st dot is generated.

Step S804:

The image management list display process unit 201 performs the reducing process to the image 601(3) generated in step S803 so that the image 601(3) goes in an area obtained by excluding the areas of the reduced images of the images 601R(3) and 601L(3) which are obtained in step S809, which will be explained hereinlater, from the thumbnail frame 602 of a predetermined size, thereby generating a reduced image of the image 601(3).

At this time, the reducing process is performed while keeping the aspect ratio of the image 601(3) (the reducing process at the same zoom ratio in both of the vertical and lateral directions).

For example, if the thumbnail frame 602 has a size of lateral 100 dots×vertical 100 dots and each of the reduced images of the images 601R(3) and 601L(3) has a size of lateral 20 dots×vertical 20 dots, a reduced image of the image 601(3) of lateral 60 dots×vertical 20 dots is generated.

Step S806:

The image management list display process unit 201 obtains an image 601L(X) at the left end in the images at both right and left ends obtained by excluding the image 601(3) generated in step S803 from the target image 601.

Thus, in the case where the image 601 is an image of the lateral size X=1800 dots and the vertical size Y=200 dots and the image 601(3) generated in step S803 is an image of an area corresponding to 600 dots from the lateral 601st dot (the image of the lateral size X(3)=600 dots and the vertical size Y=200 dots), the image 601L(X) of the lateral size=600 dots and the vertical size=200 dots of 600 dots in a range from the lateral first dot to the 600th dot is obtained.

Step S807:

The image management list display process unit 201 performs the reducing process to the image 601L(3) obtained in step S806 so as to go in an area of the reduced image of the image 601L(3) in step S804, thereby generating a reduced image of the image 601L(3).

Thus, if the thumbnail frame 602 has a size of lateral 100 dots×vertical 100 dots and the reduced image of the image 601(3) is an image of lateral 60 dots×vertical 20 dots, a reduced image of the image 601L(3) of lateral 20 dots× vertical 20 dots is obtained.

Step S808:

The image management list display process unit 201 obtains an image 601R(X) at the right end in the images at both right and left ends obtained by excluding the image 601(3) generated in step S803 from the target image 601.

Thus, in the case where the image 601 is an image of the lateral size X=1800 dots and the vertical size Y=200 dots and the image 601(3) generated in step S803 is an image of the area corresponding to 600 dots from the lateral 601st dot (the image of the lateral size X(3)=600 dots and the vertical size Y=200 dots), the image 601R(X) of the lateral size=600 dots and the vertical size=200 dots of 600 dots in a range from the lateral 1201st dot to the 1800th dot is obtained.

Step S809:

The image management list display process unit 201 performs the reducing process to the image 601R(3) obtained in step S808 so as to go in an area of the reduced image of the image 601R(3) in step S808, thereby generating a reduced image of the image 601R(3).

Thus, if the thumbnail frame 602 has a size of lateral 100 dots×vertical 100 dots and the reduced image of the image 601(2) is an image of lateral 60 dots×vertical 20 dots, a reduced image of the image 601R(3) of lateral 20 dots× vertical 20 dots is obtained.

The size of each of the reduced images of the images 601R(3) and 601L(3) is determined on the basis of the size of reduced image of the image 601(3) derived in step S804.

That is, the images 601R(3) and 601L(3) are varied and reduced so as to go in the thumbnail frame when each of the reduced images of the images 601R(3) and 601L(3) is added to the reduced image of the image 601(3).

Step S810:

If each of the reduced images of the images 601(3), 601L(3), and 601R(3) in the mid section and both end sections of the target image 601 is obtained by steps S803 to S809, the image management list display process unit 201 synthesizes those reduced images into one image.

Thus, a thumbnail image of the target image 601 of the lateral 100 dots×vertical 20 dots is generated.

After that, the processing routine advances to next step S811.

Step S805:

As a result of the discrimination in step S802, if it is determined that the ratio of the lateral size X and vertical size Y of the image 601 is less than 5:1, the image management list display process unit 201 performs a reducing process to the image 601 itself so that the image 601 goes in the thumbnail frame 602 of the predetermined size, thereby generating the thumbnail image of the image 601.

At this time, the reducing process is performed while keeping the aspect ratio of the image 601 (the reducing process at the same zoom ratio in both of the vertical and lateral directions).

For example, thus, if the thumbnail frame 602 has a size of lateral 100 dots×vertical 100 dots, a thumbnail image of the lateral 100 dots×vertical 20 dots is generated.

After that, the processing routine advances to next step S811.

Step S811:

The image management list display process unit 201 adds the thumbnail image generated in step S810 or S805 as thumbnail data into the thumbnail file 302.

As mentioned above, according to the embodiment, when the list of the images in the folder designated by the user is displayed (thumbnail display) by the thumbnail image (reduced image), if the aspect ratio of the target image is equal to or larger than the predetermined value, the image whose aspect ratio is less than the predetermined value (the value of the aspect ratio which is decided in consideration of the area that is necessary for adding the reduced images in both right and left end sections excluding the mid section of the target image) is obtained from the mid section of the target image. The thumbnail image is generated while keeping the aspect ratio of the image. After that, the reduced images in both right and left end sections excluding the mid section of the target image (reduced images obtained at the reduction ratios different from the reduction ratio at the time of reduction of the image of the mid section) are added to both right and left end sections of the thumbnail image, thereby obtaining the thumbnail image of the target image and list displaying. Therefore, a situation such that when the laterally-wide image is thumbnail displayed, it is displayed in an elongated state like a rod as in the conventional one is eliminated. The user looks at the thumbnail displayed image and can identify what kind of image such an image is. The user can also easily identify that it is a laterally-wide image and can observe a range wider than those in the first and second embodiments.

The embodiment 3 is very effective in the case where a difference between the vertical and lateral sizes is very large. (For example, in the case where one of the vertical and lateral sizes is ten times as large as the other, or the like). This is because if the image is merely picked out in the first embodiment, there is a possibility that the picked-out portion is too smaller than the whole image.

On the other hand, when a size ratio is not so large, since an atmosphere of the whole image can be recognized even by observing only the picked-up portion, it is not always necessary to apply the form like an embodiment 3.

It is, therefore, possible to switch the first to third embodiments in accordance with a magnitude of the aspect ratio.

That is, in the case where the aspect ratio lies within a range from 3 times to 5 times, the first embodiment is applied and, when it is larger than 5 times, the embodiment can be switched to the third embodiment.

Although the first to third embodiments have been described with respect to the case where the target image is a laterally-wide image, the invention can be also applied to a case where the target image is a vertically-long image.

For example, in this case, it is sufficient to construct the apparatus in such a manner that the image whose aspect ratio is less than a predetermined value (the value of the aspect ratio which is determined in consideration of the area that is necessary for adding the marks) is obtained from the mid section of the target image and a thumbnail image is generated while keeping the aspect ratio of such an image and, after that, the marks are added to both upper and lower end sections of the thumbnail image, and the image is list displayed.

As another method, it is also possible to construct the apparatus in such a manner that reduced images of both upper and lower end sections excluding the mid section of the target image (reduced images obtained by reducing at reduction ratios different from a reduction ratio at the time of reducing the image in the mid section) are added to both upper and lower end sections of the thumbnail image in the mid section of the target image, and a thumbnail image of the target image is obtained and list displayed.

Naturally, the objects of the invention can be also accomplished by a method whereby program codes of the software for realizing the functions of the host and terminals in each of the first to third embodiments mentioned above are stored in a storage medium, the storage medium is supplied to a system or an apparatus, and a computer (or a CPU or an MPU) of the system or apparatus reads out the program codes stored in the storage medium and executes a part or all of actual processes on the basis of the read-out program codes.

In this case, the program codes themselves read out from the storage medium realize the functions of the embodiments mentioned above, and the storage medium in which the program codes have been stored constructs the invention.

As a storage medium for supplying the program codes, it is possible to use an ROM, a floppy disk, a hard disk, an optical disk, a magnetooptic disk, a CD-ROM, a CD-R, a magnetic tape, a non-volatile memory card, or the like.

Naturally, the invention also incorporates not only a case where a computer executes the read-out program codes, so that the functions of the embodiments mentioned above are realized, but also a case where the OS or the like which operates on the computer executes a part or all of the actual processes on the basis of instructions of the program codes and the functions of the embodiments mentioned above are realized by those processes.

Further, the invention also incorporates a case where the program codes read out from the storage medium are written in a memory equipped for a function expanding board inserted in a computer or a function expanding unit connected to a computer and, thereafter, a CPU or the like equipped for the function expanding board or function expanding unit executes a part or all of the actual processes on the basis of instructions of the program codes and the functions of the embodiments mentioned above are realized by those processes.

According to the invention as described above, in case of an extremely vertically-long or laterally-wide image like a panorama image, since the thumbnail image is generated mainly from the mid section of such an image, even in case of the thumbnail display according to the image management list software, it is possible to easily and accurately identify a point that the image is elongated, what kind of image, and the like.

The present invention is not limited to the foregoing embodiments but many modifications and variations are possible within the spirit and scope of the appended claims of the invention.

What is claimed is:

1. An image processing apparatus comprising:
    image obtaining means for obtaining a second image of a predetermined aspect size ratio from a first image on the basis of an aspect size ratio of said first image;
    reducing means for reducing the second image obtained by said image obtaining means;
    associating means for associating the second image reduced by said reducing means with the first image; and
    adding means for adding specific information to an arbitrary end section of the reduced image obtained by said reducing means.

2. An apparatus according to claim 1, wherein when the aspect size ratio of the first image is out of a predetermined range, said image obtaining means obtains the second image.

3. An apparatus according to claim 2, wherein said image obtaining means generates an image of the aspect size ratio of the predetermined value as the second image.

4. An apparatus according to claim 1, wherein said reducing means reduces the second image obtained by said image obtaining means at a same reduction ratio in both vertical and lateral directions of the second image.

5. An apparatus according to claim 1, wherein said reducing means obtains the reduced image such that the reduced image to which the specific information was added by said adding means goes in an image frame of a predetermined size.

6. An apparatus according to claim 1, wherein said adding means adds the specific information to both end sections in the longitudinal direction between the vertical and lateral directions of the reduced image.

7. An apparatus according to claim 1 wherein said adding means uses a reduced image to which the specific information was added as an image for display.

8. An image processing apparatus comprising:
    image obtaining means for obtaining at least two images of a second image in an arbitrary area portion of a first image and a third image in the other area portion on the basis of an aspect size ratio of the first image;
    reducing means for reducing the second and third images obtained by said image obtaining means at different reduction ratios, respectively;
    synthesizing means for synthesizing the second and third images to obtain a synthesized image; and
    associating means for associating the synthesized image obtained by said synthesizing means with the first image.

9. An apparatus according to claim 8, wherein in the case where the aspect size ratio of the first image is out of a predetermined range, said image obtaining means obtains the second and third images.

10. An apparatus according to claim 8, wherein said reducing means reduces the second and third images at the different reduction ratios so that the second and third images after completion of the reduction go in an image frame of a predetermined size, respectively.

11. An apparatus according to claim 8, wherein said reducing means reduces the second image at a same reduction ratio in both vertical and lateral directions of the second image, reduces the third image at a reduction ratio larger than that of the second image in the direction corresponding to the longitudinal direction of the first image between the vertical and lateral directions of the third image, and reduces the third image at a same reduction ratio as that of the second image in the other direction.

12. An apparatus according to claim 8, wherein said image obtaining means obtains the second image from the arbitrary area portion of the first image.

13. An apparatus according to claim 8, wherein the arbitrary area portion includes a middle section of the first image.

14. An apparatus according to claim 8, wherein said image obtaining means picks out the second image having a size of a $(a<A) \times B$ from the first image, where
    A is size in the longitudinal direction between the vertical and lateral directions of the first image, and
    B is size in the minor direction of the first image.

15. An apparatus according to claim 8, further comprising display means for displaying reduced images obtained by said reducing means.

16. An apparatus according to claim 15, wherein said display means displays a list of a plurality of reduced images obtained by said reducing means.

17. An image processing system to which a plurality of units of equipment are connected so that they can communicate, wherein at least one of said plurality of units of equipment has a function of an image processing apparatus, and said image processing apparatus comprises:
    image obtaining means for obtaining a second image of a predetermined aspect size ratio from a first image on the basis of an aspect size ratio of the first image;
    reducing means for reducing the second image obtained by said image obtaining means;
    associating means for associating the second image reduced by said reducing means with the first image; and
    adding means for adding specific information to an arbitrary end section of the reduced image obtained by said reducing means.

18. An image processing method which can manage a plurality of images and display a list by using reduced images of the images, comprising:

a generating step, of, when a target image is an elongated image whose aspect ratio is larger than a first predetermined value, generating a reduced image of an aspect ratio of a second predetermined value from an arbitrary area portion of the target image;

a display step, of displaying the reduced image of the aspect ratio of the second predetermined value generated in said generating step;

an associating step, of associating the reduced image with the target image; and an adding step, of adding specific information to an arbitrary end section of the reduced image obtained in said reducing step.

19. A method according to claim 18, wherein the second predetermined value includes the first predetermined value.

20. A method according to claim 18, wherein in said generating step, a same reduction ratio is set in both vertical and lateral directions of the reduced image.

21. A method according to claim 18, wherein specific marks are added to one or a plurality of upper, lower, right, and left positions of the reduced image of the aspect ratio of the second predetermined value.

22. A method according to claim 21, wherein the specific marks are added to both ends in the longitudinal direction of the reduced image of the aspect ratio of the second predetermined value.

23. A method according to claim 21, wherein in said generating step, the reduced image to which the specific marks were added is used as a reduced image for display.

24. A method according to claim 18, wherein the arbitrary area portion includes a mid section of the target image.

25. A method according to claim 18, wherein the arbitrary area portion includes an area having a size of a (a<A)×B, where A is size in the longitudinal direction between the vertical and lateral directions of the target image, and B is size in the minor direction of the target image.

26. An image processing method which can manage a plurality of images and display a list by using reduced images of the images, comprising:

a generating step, of, when a target image is an elongated image whose aspect ratio is larger than a predetermined value, generating a reduced image of the target image, said generating including obtaining a second image from an arbitrary area portion of the target image and a third image from the other area portion of the target image on the basis of the aspect size ratio of the first image, by making reduction ratios in the vertical and lateral directions different in the arbitrary area portion and the other area portion of the target image, respectively, and synthesizing the second and third images to obtain the reduced image;

a display step, of displaying the reduced image generated in the generating step; and an associating step, of associating the reduced image with the target image.

27. A method according to claim 26, wherein said generating step includes the steps of:

reducing the arbitrary area portion at a same reduction ratio in both vertical and lateral directions;

when the target image is a laterally-wide image, setting the reduction ratio in the lateral direction in the other area portion to be larger than that in the vertical direction, making the reduction ratio in the vertical direction identical to that of the arbitrary area portion, and reducing the image; and when the target image is a vertically-long image, making the reduction ratio in the lateral direction in the other area portion identical to that in the arbitrary area portion, setting the reduction ratio in the vertical direction to be larger than that in the lateral direction, and reducing the image.

28. A storage medium which stores a computer-readable program, wherein said program realizes an image processing method comprising:

a generating step, of, when a target image is an elongated image whose aspect ratio is larger than a first predetermined value, generating a reduced image of an aspect ratio of a second predetermined value from an arbitrary area portion of the target image;

a display step, of displaying the reduced image of the aspect ratio of the second predetermined value generated in said generating step;

an associating step, of associating the reduced image with the target image; and an adding step of adding specific information to an arbitrary end section of the reduced image obtained in said reducing step.

29. A storage medium which stores a computer-readable program, wherein said program realizes an image processing method comprising:

a generating step, of, when a target image is an elongated image whose aspect ratio is larger than a predetermined value, generating a reduced image of the target image, said generating including obtaining a second image from an arbitrary area portion of the target image and a third image from the other area portion of the target image on the basis of the aspect size ratio of the first image, by making reduction ratios in the vertical and lateral directions different in the arbitrary area portion and the other area portion of the target image, respectively, and synthesizing the second and third images to obtain the reduced image;

a display step, of displaying the reduced image generated in the generating step; and an associating step, of associating the reduced image with the target image.

* * * * *

UNITED STATES PATENT AND TRADEMARK OFFICE
CERTIFICATE OF CORRECTION

PATENT NO.    : 6,868,192 B2
DATED         : March 15, 2005
INVENTOR(S)   : Hideo Takiguchi It is certified that error appears in the above-identified patent and that said Letters Patent is hereby corrected as shown below:

Drawings,
Sheet 8, Fig 8, "SIDE" should read -- SIDES --.
Sheet 10, Fig 10, "TP" should read -- TO -- in step S809; and "END" should read -- ENDS -- in step S810.

Column 13,
Line 65, "claim 1" should read -- claim 1, --.

Column 16,
Line 32, "step" should read -- step, --.

Signed and Sealed this

Ninth Day of August, 2005

JON W. DUDAS
*Director of the United States Patent and Trademark Office*